(12) United States Patent
Liu et al.

(10) Patent No.: US 9,253,619 B2
(45) Date of Patent: Feb. 2, 2016

(54) APPARATUS AND METHOD OF DATA COMMUNICATIONS IN MILLIMETER WAVE NETWORK

(71) Applicant: MediaTek Singapore Pte. Ltd., Singapore (SG)

(72) Inventors: Jianhan Liu, San Jose, CA (US); James June-Ming Wang, San Marino, CA (US); Chi-Shi Yee, Baoshan Township, Hsinchu County (TW); Thomas Edward Pare, Jr., Mountain View, CA (US); YungPing Hsu, Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 115 days.

(21) Appl. No.: 14/020,416

(22) Filed: Sep. 6, 2013

(65) Prior Publication Data

US 2014/0071892 A1 Mar. 13, 2014

Related U.S. Application Data

(60) Provisional application No. 61/700,583, filed on Sep. 13, 2012.

(51) Int. Cl.
*H04W 4/00* (2009.01)
*H04W 8/00* (2009.01)
*H04L 1/00* (2006.01)
*H04W 28/06* (2009.01)

(52) U.S. Cl.
CPC ............... *H04W 8/00* (2013.01); *H04L 1/007* (2013.01); *H04L 1/0057* (2013.01); *H04W 28/06* (2013.01)

(58) Field of Classification Search
None
See application file for complete search history.

(56) References Cited

U.S. PATENT DOCUMENTS

| | | | |
|---|---|---|---|
| 2002/0012343 A1* | 1/2002 | Holloway et al. | 370/389 |
| 2009/0046593 A1* | 2/2009 | Ptasinski et al. | 370/252 |
| 2010/0080266 A1* | 4/2010 | Zhang et al. | 375/140 |

* cited by examiner

*Primary Examiner* — Minh-Trang Nguyen
(74) *Attorney, Agent, or Firm* — McClure, Qualey & Rodack, LLP

(57) ABSTRACT

The method and apparatus of data communications for a transmitter in a millimeter wave network are provided. The method includes: generating a control physical layer (CPHY) preamble; generating a header, wherein the header includes a mode indicator; modulating and encoding a payload according to the mode indicator; generating a packet according to the control physical layer (CPHY) preamble, the header and the payload; and transmitting the packet.

17 Claims, 6 Drawing Sheets

APPARATUS AND METHOD OF DATA COMMUNICATIONS IN MILLIMETER WAVE NETWORK

CROSS REFERENCE TO RELATED APPLICATIONS

This Application claims priority of U.S. Provisional Patent Application No. 61/700,583, filed on Sep. 13, 2012, the entirety of which is incorporated by reference herein.

BACKGROUND OF THE INVENTION

1. Field of the Invention

The invention generally relates to data communications in a millimeter wave network, and more particularly, to the re-design of a header of a Control Physical layer (CPHY) for transmitting data.

2. Description of the Related Art

Millimeter wave (mmWave) technology allows for a new era in multigiga bits per second (bps) wireless communications for consumer electronics because of the huge available bandwidth worldwide. For example, 7 GHz (from 57-64 GHz) of unlicensed spectrum is available in the United State and Source Korea and 9 GHz of unlicensed spectrum is available in Europe.

The standards in 60 GHz wireless networks, such as the IEEE 802.11aj standard, IEEE 802.11ad, and Wireless Gigabit Alliance (WiGig), have been developed or are being developed by different industry consortiums and international standard organizations. The WiGig and IEEE 802.11ad standards are two promising standards with a majority of support from industry. It is very likely that the upcoming 802.11aj standard adopts the physical layer specification of the IEEEE 802.11ad standard.

In mmWave WPAN and IEEE 802.11ad, control PHY (CPHY) and data PHY (DPHY) are defined. In the Table 1, CPHY and Lowest rate DPHY transmit at very low data rates and are used for discovery mode. DPHY transmits at high data rates and is used for data communications. Generally, CPHY is operated in an omni-directional mode or quasi-omni directional mode and DPHY is operated in a directional mode. Therefore, DPHY requires higher signal-to-noise-ratio (SNR) than CPHY. For current mmWave WPAN based on the WiGig and IEEE 802.11ad standard, the minimum SNR requirement of DPHY is 12 dB (e.g. −1−(−13)=12 dB) higher than SNR required by CPHY, i.e. if the SNR difference of DPHY and CPHY is not higher than 12 dB, the DPHY may not work. The true SNR difference is limited by the size of the antenna array at the Space-Time Antenna (STA) and is defined by the condition: (True SNR difference)<10*$\log_{10}$ (number of antenna elements). Therefore, the STA must be equipped with an antenna array of more than 16 elements.

TABLE 1

| TYPE | MCS | DATA RATE | Required SNR |
|---|---|---|---|
| CPHY | DBPSK, ~½ code, Spreading 32 | 27 Mbps | −13 dB |
| Lowest DPHY | BPSK, ~½ code, Repetition 32 | 385 Mbps | −1 dB |

However, antenna arrays with a large number of antenna elements are not suitable for mobile devices due to size factor. Therefore, coverage problems may occur. For example, for a mobile device equipped with 4 antenna elements, SNR of the DPHY is just 6 dB (10 $\log_{10}$4~6<12) higher than the SNR of CPHY. Therefore, CPHY works fine but DPHY does not work. Namely, the mobile device can be associated with access point (AP) or personal basic service set central point (PBSS central point, PCP), but can't transmit/receive any data.

BRIEF SUMMARY OF THE INVENTION

Apparatuses and methods of data communications in millimeter wave network are provided to overcome the above mentioned problems.

An embodiment of the invention provides a method of data communications for a transmitter in a millimeter wave network, comprising: generating a control physical layer (CPHY) preamble; generating a header, wherein the header comprises a mode indicator; modulating and encoding a payload according to the mode indicator; generating a packet according to the control physical layer (CPHY) preamble, the header and the payload; and transmitting the packet.

An embodiment of the invention provides a method for data communications for a receiver in a millimeter wave network, comprising: receiving a packet; determining a type of the packet; determining a mode of the packet and demodulating and decoding the packet according to the mode of the received packet.

An embodiment of the invention provides a transmitter in a millimeter wave network, comprising: a preamble generator, configured to generate a control physical layer (CPHY) preamble; a header generator, configured to generate a header, wherein the header comprises a mode indicator; and a payload generator, modulating and encoding a payload according to the mode indicator.

An embodiment of the invention provides a receiver in a millimeter wave network, comprising: a preamble processor, configured to determine a type of a packet; a header processor, configured to determine a mode of the packet; and a decoder, configured to demodulate and decode the packet according to the mode of the packet.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

This description is made for the purpose of illustrating the general principles of the invention and should not be taken in a limiting sense. The scope of the invention is best determined by reference to the appended claims.

Figure 1:
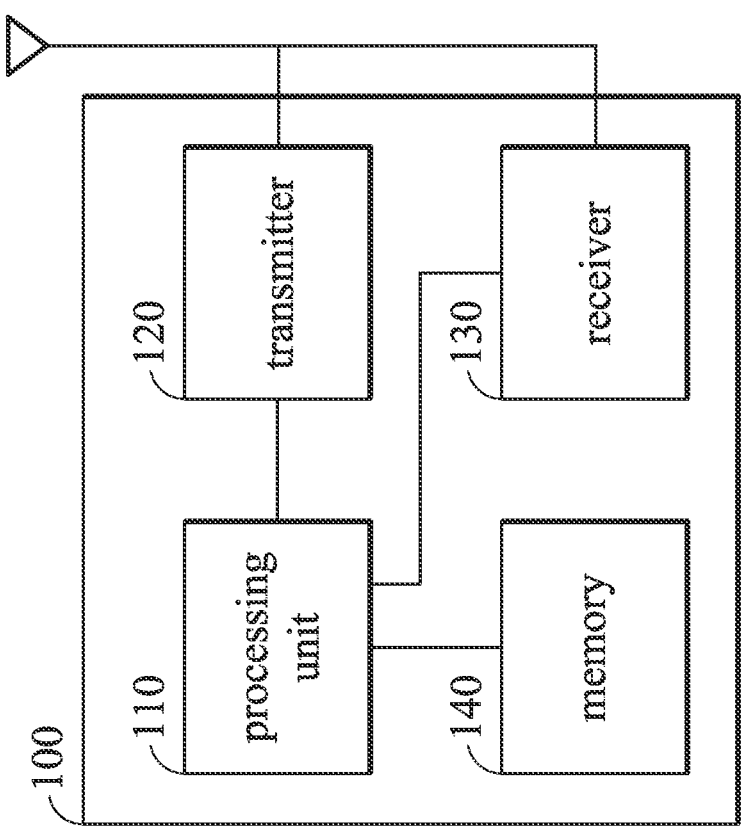
FIG. 1 is a block diagram of a User Equipment (UE) 100 according to an embodiment of the invention.

FIG. 1 is a block diagram of a User Equipment (UE) 100 according to an embodiment of the invention, wherein the UE 100 can be applied in a millimeter wave network based on the IEEE 802.11ad and/or IEEE 802.11aj specification. The UE 100 may be a mobile communications device, such as a cellular phone, a smart phone modem processor, a data card, a laptop stick, a mobile hotspot, an USB modem, a tablet, or others. The UE 100 comprises a processing unit 110, a transmitter 120, a receiver 130 and a memory device 140, and an antenna module comprising at least one antenna. The processing unit 110 may be a general-purpose processor, or a Micro-Control Unit (MCU), or others, to execute the program codes stored in the memory device 140. The transmitter 120 and the receiver 130 are connected with the antenna module to transmit/receive the wireless signals via the antenna. In some embodiments, the transmitter 120 and the receiver 130 may connect with or include a RF module (not present) to receive RF signals via the antenna and process the received RF signals to convert the received RF signals to baseband signals. The memory device 140 may be a volatile memory, e.g. a Random Access Memory (RAM), or a non-volatile memory, e.g. a flash memory, Read-Only Memory (ROM), or hard disk, or any combination thereof. Note that, in some embodiments of the invention, the user equipment 100 may further be extended to comprise more than one antenna and/or more than one radio module, and the invention should not be limited to what is shown in FIG. 1.

Figure 2:
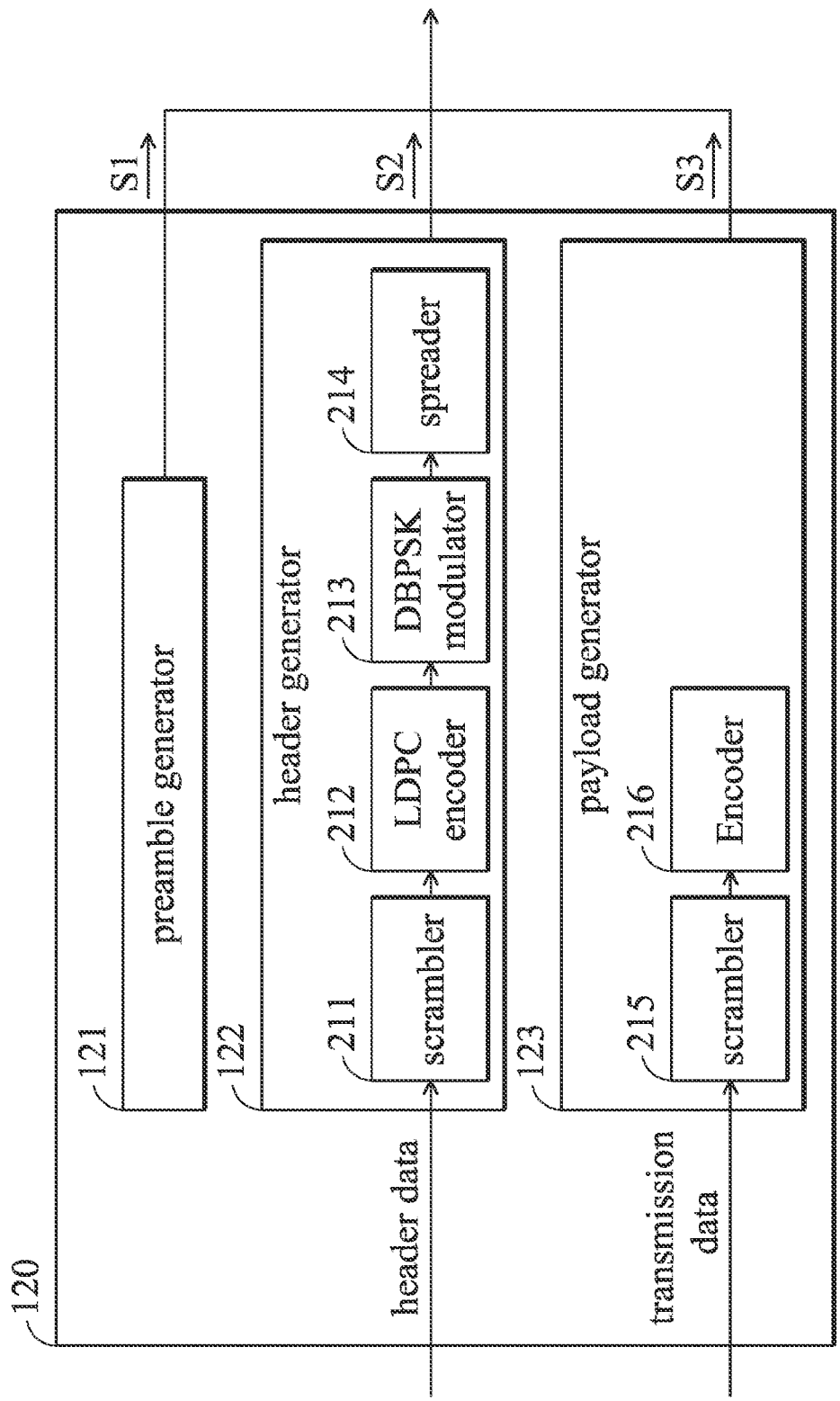
FIG. 2 is a block diagram of a transmitter 120 according to an embodiment of the invention.

FIG. 2 is a block diagram of a transmitter 120 according to an embodiment of the invention. In FIG. 2, the transmitter 120 comprises a preamble generator 121, header generator 122, payload generator 123. The preamble generator 121 is configured to generate a preamble S1, wherein the preamble S1 is the same as a control physical layer (CPHY) preamble. In an embodiment, the preamble can follow the IEEE 802.11ad standard. The preamble S1 comprises a Short Training Field (STF) and a Channel Estimation Field (CEF). The Short Training Field (STF) comprises 48 repetitions of the sequence Gb128(n) of length 128, a sequence-Gb128(n) and a sequence-Ga128(n). The sequences Gb128(n) and Ga128(n) are Golay sequences defined in the WiGig specification and IEEE 802.11ad standard. The Channel Estimation Field (CEF) comprises two sequences Gu512(n), Gv512(n) of length 512 and a sequence Gv128(n) of length 128. The sequences Gu512(n), Gv512(n) and Gv128(n) are also defined in the WiGig specification and IEEE 802.11ad standard. Note that since the STF in the data PHY adopts different Golay sequences, control PHY (CPHY) and data PHY (DPHY) can be detected according to the STF.

The header generator 122 comprises a scrambler 211, a Low Density Parity Check (LDPC) encoder 212, a DBPSK modulator 213, and a spreader 214. The header generator 122 is configured to generate a modified header S2, wherein the modified header S2 comprises a mode indicator for indicating a plurality of Modulation Coding Scheme (MCS) modes. The modified header S2 is scrambled by the scrambler 211. The modified header S2 is encoded by the LDPC encoder 212. The modified header S2 is modulated by the DBPSK modulator 213. The modified header S2 is spread with sequence Ga32(n) by the spreader 214. Because the header generator 122 is similar to the CPHY header generator, the modified header is transmitted the same way as the CPHY header. However, the modified header S2 re-defines the reserved bits of the CPHY header (presented MCS mode field of the Tables 2-3). Therefore, the MCS modes in the modified header S2 are defined by setting the reserved bits of a CPHY header. In the general CPHY header, two reserved bits are defined according to the IEEE 802.11ad standard and they are only set to 0 in the CPHY header.

Table 2 is a schematic diagram of the modified header S2 according to an embodiment. As shown in the Table 2, if the reserved bits are set to 0, it indicates an original CPHY mode (such as CPHY in Table 1). If the reserved bits are set to 1, the payload is modulated according to a first MCS mode. If the reserved bits are set to 2, the payload is modulated according to a second MCS mode, and if the reserved bits are set to 3, the payload is modulated according to a third MCS mode.

TABLE 2

| Field name | Number of Bits | Starting Bit | Description |
|---|---|---|---|
| Reserved | 1 | 0 | Set to 0 (differential detector initialization) |
| Scrambler Initialization | 4 | 1 | Bits of the initial scrambler state |
| Length | 10 | 5 | Number of date octets in the PSDU. Range 14-1023 |
| Pack Type | 1 | 15 | TRN packet type |
| Training Length | 5 | 16 | Length of the training field |
| SIFS response | 1 | 21 | Set to 1 if the STA is transmitting a packet during an SP or TXOP |
| MCS mode (Reserved bits) | 2 | 22 | Set to 0: CPHY, ignored by the receiver<br>Set to 1: first MCS mode<br>Set to 2: second MCS mode<br>Set to 3: third MCS mode |
| HCS | 16 | 24 | Header Check sequence |

Table 3 is a schematic diagram of the modified header S2 according to another embodiment. In the Table 3. If the reserved bits are set to 0, it indicates an original CPHY mode (such as CPHY in Table 1). If the reserved bits are set to 1, the payload is modulated according to a first MCS mode. If the reserved bits have been set to 2, the payload is modulated according to a second MCS mode, and if the reserved bits have been set to 3, the reserved bits are reserved.

TABLE 3

| Field name | Number of Bits | Starting Bit | Description |
|---|---|---|---|
| Reserved | 1 | 0 | Set to 0 (differential detector initialization) |
| Scrambler Initialization | 4 | 1 | Bits of the initial scrambler state |
| Length | 10 | 5 | Number of date octets in the PSDU. Range 14-1023 |
| Pack Type | 1 | 15 | TRN packet type |
| Training Length | 5 | 16 | Length of the training field |
| SIFS response | 1 | 21 | Set to 1 if the STA is transmitting a packet during an SP or TXOP |
| MCS mode (Reserved bits) | 2 | 22 | Set to 0: CPHY, ignored by the receiver<br>Set to 1: first MCS mode<br>Set to 2: second MCS mode<br>Set to 3: reserved |
| HCS | 16 | 24 | Header Check sequence |

The MCS modes, such as the first MCS mode, the second MCS mode and the third MCS mode, are selected from Table 4. For example, the first MCS mode may be R1, the second MCS mode may be R3, and the third MCS mode may be R5. Note the MCS modes in Table 2 are only taken as examples, and it is to be understood that the invention is not limited thereto. Those who are skilled in this technology can still use other parameters for different situations.

TABLE 4

| MCS mode | Data Rate | MCS mode | Spreading sequence of length |
|---|---|---|---|
| R0 | 54 Mbps | DQPSK, ½ code, spreading ratio 32 | 32 |
| R1 | 54 Mbps | DBPSK, ½ code, spreading ratio 16 | 16 |
| R2 | 108 Mbps | DQPSK, ½ code, spreading ratio 16 | 16 |
| R3 | 108 Mbps | DBPSK, ½ code, spreading ratio 8 | 8 |
| R4 | 216 Mbps | DQPSK, ½ code, spreading ratio 8 | 8 |
| R5 | 216 Mbps | DBPSK, ½ code, spreading ratio 4 | 4 |
| R6 | 54 Mbps | QPSK, ½ code, spreading ratio 32 | 32 |
| R7 | 54 Mbps | BPSK, ½ code, spreading ratio 16 | 16 |
| R8 | 108 Mbps | QPSK, ½ code, spreading ratio 16 | 16 |
| R9 | 108 Mbps | BPSK, ½ code, spreading ratio 8 | 8 |
| R10 | 216 Mbps | QPSK, ½ code, spreading ratio 8 | 8 |

Figure 3:
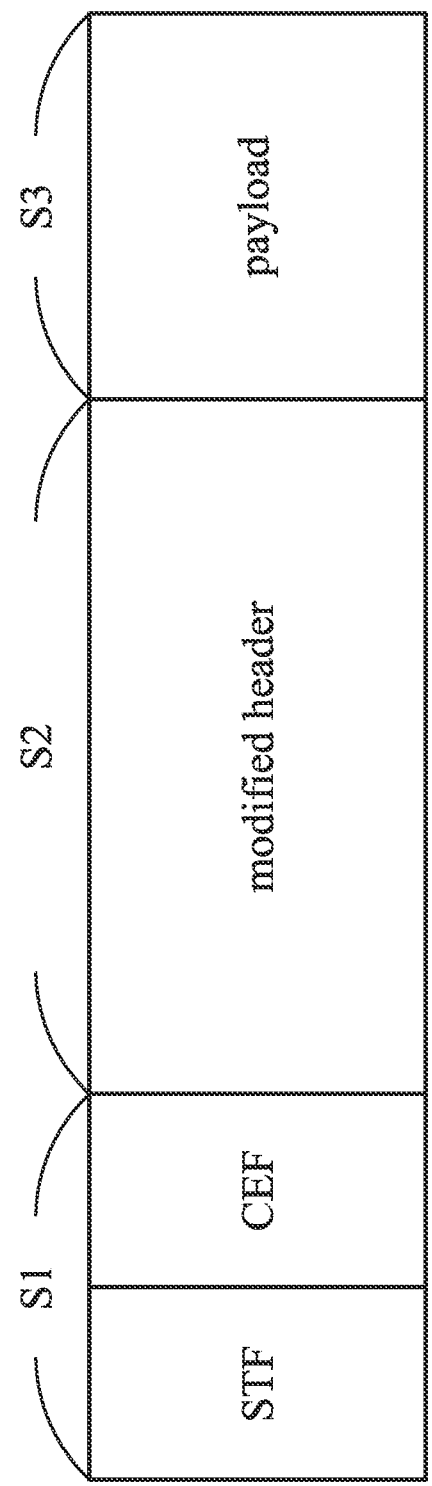
FIG. 3 is a schematic diagram of the packet according to an embodiment of the invention.

The payload generator 123 comprises a scrambler 215, and an encoder 216. The payload generator 123 is configured to scramble, modulate and encode the transmission data for generating a payload S3 by the scrambler 215 and the encoder 216 according to one of the MCS modes defined in the modified header S2. The preamble S1, the modified header S2 and the payload S3 are combined to generate a packet or a frame. FIG. 3 is a schematic diagram of the packet according to an embodiment of the invention. In the FIG. 3, the packet comprises the preamble S1, the modified header S2 and the payload S3.

Figure 4:
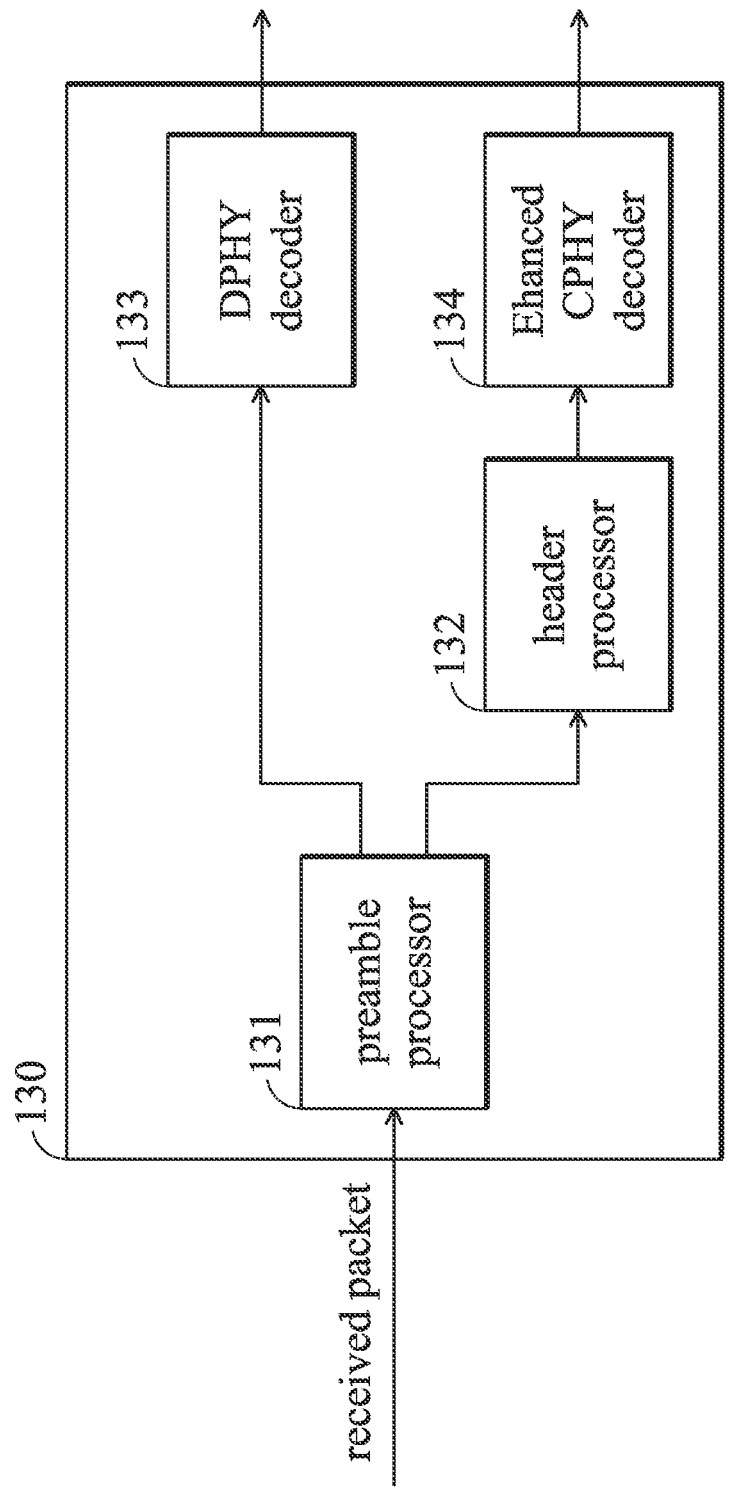
FIG. 4 is a block diagram of a receiver 130 according to an embodiment of the invention.

FIG. 4 is a block diagram of a receiver 130 according to an embodiment of the invention. In the FIG. 3 the receiver 130 comprises a preamble processor 131 and a header processor 132, a DPHY decoder 133, and an Enhanced-CPHY decoder 134. The preamble processor 131 is configured to determine the type of a received packet, such as CPHY, DPHY. As the above describes, because the STF in the DPHY adopts a different Golay sequence from the CPHY, the preamble processor 131 can determine the DPHY and CPHY according to the STF. If the received packet is DPHY, the received packet is transmitted to the DPHY decoder 133 and decoded by the DPHY decoder 133. If the received packet is CPHY, the received packet is transmitted to the header processor 132. The preamble processor 131 also provides estimated timing information, frequency offset, and channel information to the DPHY decoder 133 or header processor 132.

The header processor 132 is configured to determine an MCS mode of the received packet, wherein the MCS mode is defined by setting the reserved bits of a CPHY header. Then, the Enhanced-CPHY decoder 134 may decode the received packet according to the MCS mode of the received packet. The Enhanced-CPHY decoder 134 is indicated for distinguishing from a general CPHY decoder. In an embodiment, the receiver 130 further comprises a general CPHY decoder. The general CPHY decoder may be combined with the Enhanced-CPHY decoder 134 or an independent device connected with the header processor 132. If the header processor 132 determines that an MCS mode (Reserved bits) of the received packet is 0, the header processor 132 may transmit the received data to a general CPHY decoder. Otherwise (MCS mode is 1, 2 or 3), the header processor 132 may transmit the received data to the Enhanced-CPHY decoder 134.

In an embodiment (such as Table 2), if the header processor 132 determines that the reserved bits have been set to 0, the Enhanced-CPHY decoder 134 demodulates the received packet by an original CPHY mode. If the header processor 132 determines that the reserved bits have been set to 1, the Enhanced-CPHY decoder 134 demodulates the received packet according to a first MCS mode. If the header processor 132 determines that the reserved bits have been set to 2, the Enhanced-CPHY decoder 134 demodulates the payload according to a second MCS mode. If the header processor 132 determines that the reserved bits have been set to 3, the Enhanced-CPHY decoder 134 demodulates the received packet according to a third MCS mode. In another embodiment (such as Table 3), if the header processor 132 determines that the reserved bits have been set to 0, the Enhanced-CPHY decoder 134 demodulates the received packet an original CPHY mode. If the header processor 132 determines that the reserved bits have been set to 1, the Enhanced-CPHY decoder 134 demodulates the received packet according to a first MCS mode. If the header processor 132 determines that the reserved bits have been set to 2, the Enhanced-CPHY decoder 134 demodulates the payload according to a second MCS mode, wherein in this embodiment, if the reserved bits have been set to 3, it means that the reserved bits are reserved. In an embodiment, if the header processor 132 determines that the reserved bits have been set to 0, the received packet may be demodulated by a general CPHY decoder. Otherwise (Reserved bits have been set to 1, 2 or 3), the received packet may be demodulated by the Enhanced-CPHY decoder 134.

Figure 5:
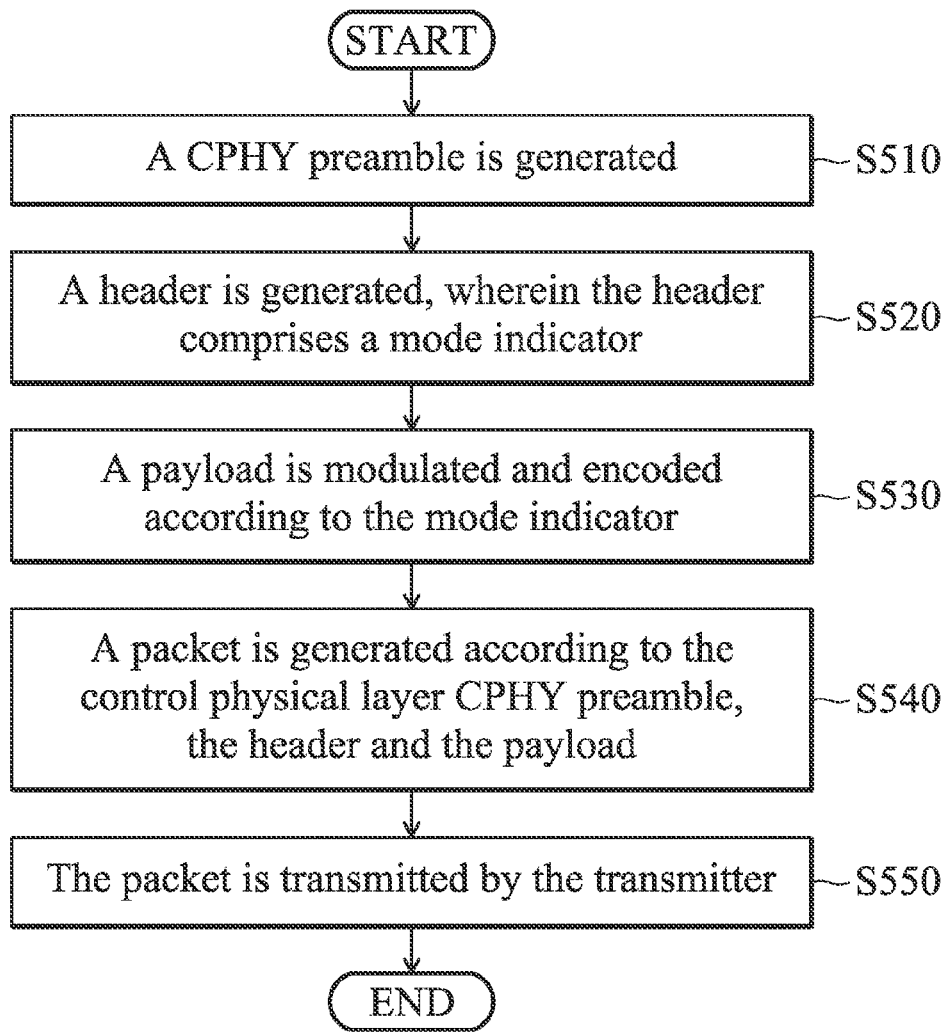
FIG. 5 is a flow chart illustrating the method of data communications for a transmitter in a millimeter wave network according to an embodiment of the invention.

FIG. 5 is a flow chart illustrating the method of data communications for a transmitter in a millimeter wave network according to an embodiment of the invention. Firstly, in step S510, a CPHY preamble is generated. In an embodiment, the CPHY preamble can be an IEEE 802.11ad preamble. Then, in the step S520, a header is generated, wherein the header comprises a mode indicator. In the step S530, a payload is modulated and encoded according to the mode indicator. In the step S540, a packet is generated according to the control physical layer CPHY preamble, the header and the payload. In the step S550, the packet is transmitted by the transmitter.

Figure 6:
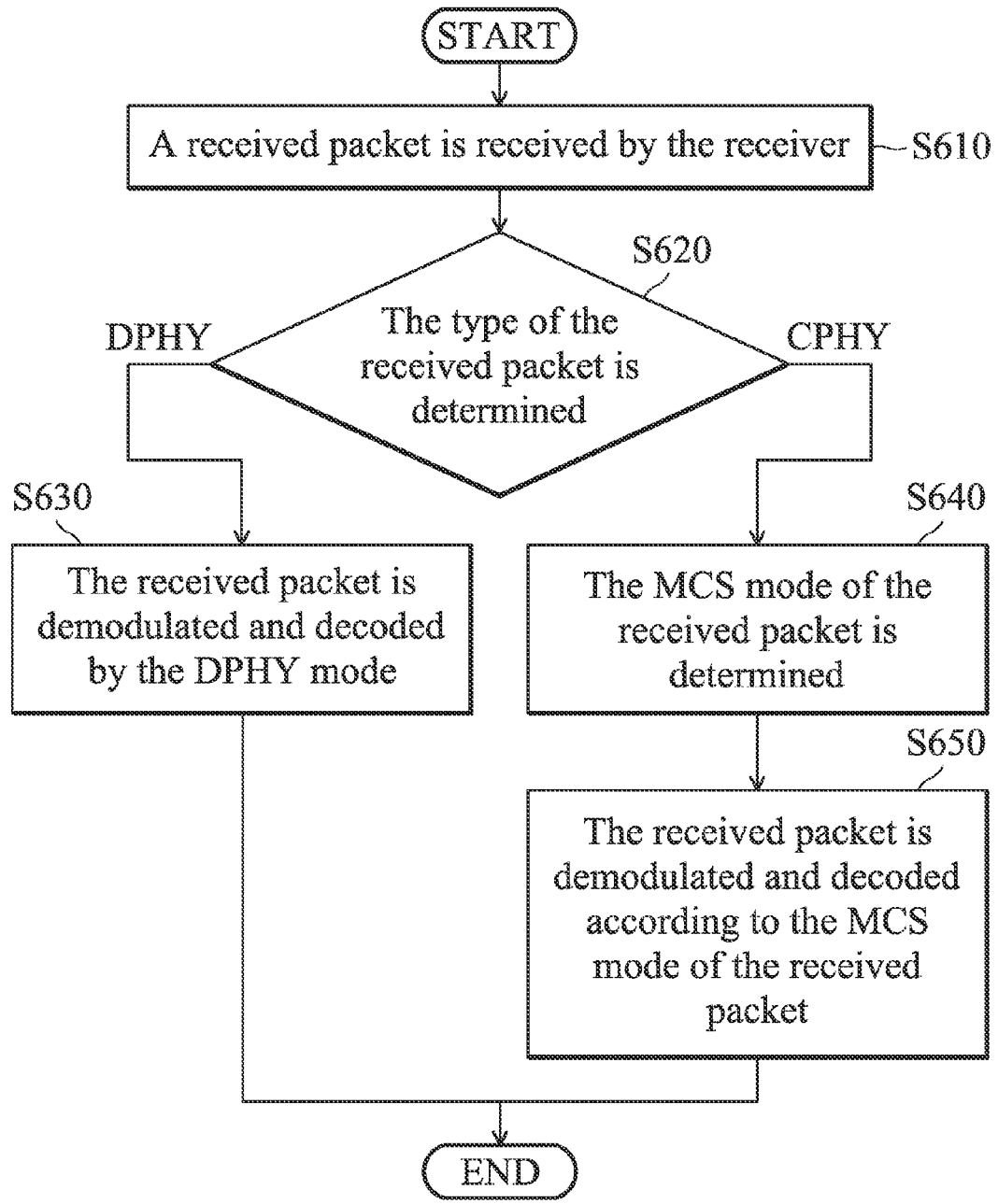
FIG. 6 is a flow chart illustrating the method of data communications for a receiver in a millimeter wave network according to an embodiment of the invention.

FIG. 6 is a flow chart illustrating the method of data communications for a receiver in a millimeter wave network according to an embodiment of the invention. Firstly, in step S610, a received packet is received by the receiver. Then in the step S620, the type of the received packet is determined. If the type of the received packet is DPHY, the step S630 is executed. In the step S630, the received packet is demodulated and decoded by the DPHY mode. If the type of the received packet is DPHY, the step S640 is executed. In the step S640, the MCS mode of the received packet is determined. In the step S650, the received packet is demodulated and decoded according to the MCS mode of the received packet.

In the methods of the embodiments, coverage problems of a mobile device equipped with a small size array are eliminated. When the mobile device is equipped with a small size array, it can transmit data by modifying the general CPHY header rather than by the DPHY. In addition, in the receiver, different decoding schemes may be processed according to the type of the receive packet and the MCS mode of the received packet.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method of data communications for a transmitter in a millimeter wave network, comprising:
    generating a control physical layer (CPHY) preamble;
    generating a header, wherein the header comprises a mode indicator, and the mode indicator is defined by setting reserved bits in the header;
    modulating and encoding a payload according to the mode indicator;
    generating a packet according to the control physical layer (CPHY) preamble, the header and the payload; and
    transmitting the packet by the transmitter.

2. The method of claim 1, wherein the mode indicator indicates an original CPHY mode, or a modulation coding scheme (MCS) mode for modulating the payload.

3. The method of claim 1, wherein the mode indicator indicates the reserved bits are reserved.

4. The method of claim 1, wherein the CPHY preamble is an IEEE 802.11ad CPHY preamble.

5. A method for data communications for a receiver in a millimeter wave network, comprising:
    receiving a packet;
    determining a type of the packet;
    determining a mode of the packet; and
    demodulating and decoding the packet according to the mode of the packet,
    wherein demodulating and decoding the packet according to a DPHY mode, if the type of the packet is DPHY; and
    wherein determining an MCS mode of the packet, if the type of the packet is CPHY.

6. The method of claim 5, wherein the mode is defined by setting reserved bits of a CPHY header.

7. The method of claim 6, wherein the mode indicates an original CPHY mode, or an MCS mode for demodulating the payload.

8. The method of claim 6, wherein the mode indicates the reserved bits are reserved.

9. The method of claim 6, further comprising extracting a CPHY preamble from the receiver packet, wherein the CPHY preamble is an IEEE 802.11ad CPHY preamble.

10. A transmitter in a millimeter wave network, comprising:
    a preamble generator, configured to generate a control physical layer (CPHY) preamble;
    a header generator, configured to generate a header, wherein the header comprises a mode indicator, and the mode indicator is defined by setting reserved bits in the header; and
    a payload generator, modulating and encoding a payload according to the mode indicator.

11. The transmitter of claim 10, wherein the mode indicator indicates an original CPHY mode, or an MCS mode for modulating the payload.

12. The transmitter of claim 10, wherein the mode indicator indicates the reserved bits are reserved.

13. The transmitter of claim 10, wherein the CPHY preamble is an IEEE 802.11 ad CPHY preamble.

14. A receiver in a millimeter wave network, comprising:
    a preamble processor, configured to determine a type of a packet;
    a header processor, configured to determine a mode of the packet;
    a decoder, configured to demodulate and decode the packet according to the mode of the packet; and
    a DPHY decoder, wherein if the type of the packet is DPHY, the preamble processor transmits the packet to the DPHY decoder and the packet is demodulated and decoded by the DPHY decoder; and if the type of the packet is CPHY, the preamble processor transmits the packet to the header processor.

15. The receiver of claim 14, wherein the mode is defined by setting reserved bits of a CPHY header.

16. The receiver of claim 15, wherein the mode indicates an original CPHY mode, or an MCS mode for demodulating the payload.

17. The receiver of claim 15, wherein the preamble processor extracts a CPHY preamble from the receiver packet, wherein the CPHY preamble is an IEEE 802.11 ad CPHY preamble.

* * * * *